June 24, 1958 M. CAMRAS 2,840,642

MAGNETIC TRANSDUCING ASSEMBLY

Filed Nov. 15, 1951 4 Sheets-Sheet 1

Inventor
Marvin Camras by Hill, Sherman, Meroni, Gross & Simpson Attys

June 24, 1958 M. CAMRAS 2,840,642

MAGNETIC TRANSDUCING ASSEMBLY

Filed Nov. 15, 1951 4 Sheets-Sheet 2

Inventor
Marvin Camras
by Hill, Sherman, Meroni, Gross & Simpson Attys

June 24, 1958 M. CAMRAS 2,840,642

MAGNETIC TRANSDUCING ASSEMBLY

Filed Nov. 15, 1951 4 Sheets-Sheet 3

Inventor
Marvin Camras
by Hill, Sherman, Meroni, Gross & Simpson Attys

June 24, 1958 M. CAMRAS 2,840,642

MAGNETIC TRANSDUCING ASSEMBLY

Filed Nov. 15, 1951 4 Sheets-Sheet 4

Inventor
Marvin Camras
by Hill, Sherman, Meroni, Gross & Simpson Attys

United States Patent Office 2,840,642

Patented June 24, 1958

2,840,642

MAGNETIC TRANSDUCING ASSEMBLY

Marvin Camras, Chicago, Ill., assignor to Armour Research Foundation of Illinois Institute of Technology, Chicago, Ill., a corporation of Illinois Application November 15, 1951, Serial No. 256,431

24 Claims. (Cl. 179—100.2)

The present invention is directed to a new and improved magnetic transducing assembly. The unit of the present invention is particularly designed as a dictating machine for home and office use and is characterized by compactness, portability, and ease of operation.

The magnetic transducing assembly of the present invention includes a rotatable turntable for receiving a disk type magnetic recording medium. The motor for driving the turntable, as well as the electrical circuits for recording, reproducing, and erasing are located in the base upon which the turntable is mounted. The assembly includes a cover member hingedly secured to the base and carrying the electromagnetic transducer head. The arrangement is such that mere closing of the cover over the base puts the electromagnetic transducer head in operative engagement with the surface of a magnetic record member disposed on the turntable. With this arrangement, the head is lifted to an out of the way position upon opening of the cover so that a magnetic record member can be readily removed from the turntable and a new record placed on the turntable.

The magnetic recording assembly of the present invention also includes means for synchronizing the position of the electromagnetic head with respect to the recorded channels on a previously recorded magnetic record member. Means are also provided for positioning the electromagnetic head upon any recorded channel of the magnetic record member while maintaining perfect synchronism between the position of the electromagnetic head and the location of the recorded channels on the record member.

An object of the present invention is to provide an improved magnetic recording assembly.

Still another object of the present invention is to provide a compact and a portable magnetic recording assembly.

Another object of the present invention is to provide a simplified magnetic recording assembly for recording on and reproducing intelligence from a disk type magnetic record medium.

An additional object of the present invention is to provide a novel back spacing means for a magnetic transducing assembly.

Another object of the present invention is to provide an improved type of magnetic record member.

Another object of the present invention is to provide a synchronizing means for locating the position of an electromagnetic head with respect to the recorded channels on a disk type magnetic record member.

The novel features which I believe to be characteristic of my invention are set forth with particularity in the appended claims. My invention itself, however, both as to its manner of construction and method of operation, together with further objects and advantages, may best be understood by reference to the following description taken in connection with the accompanying drawing in which:

As shown on the drawings.

Figures 1, 2, 3:
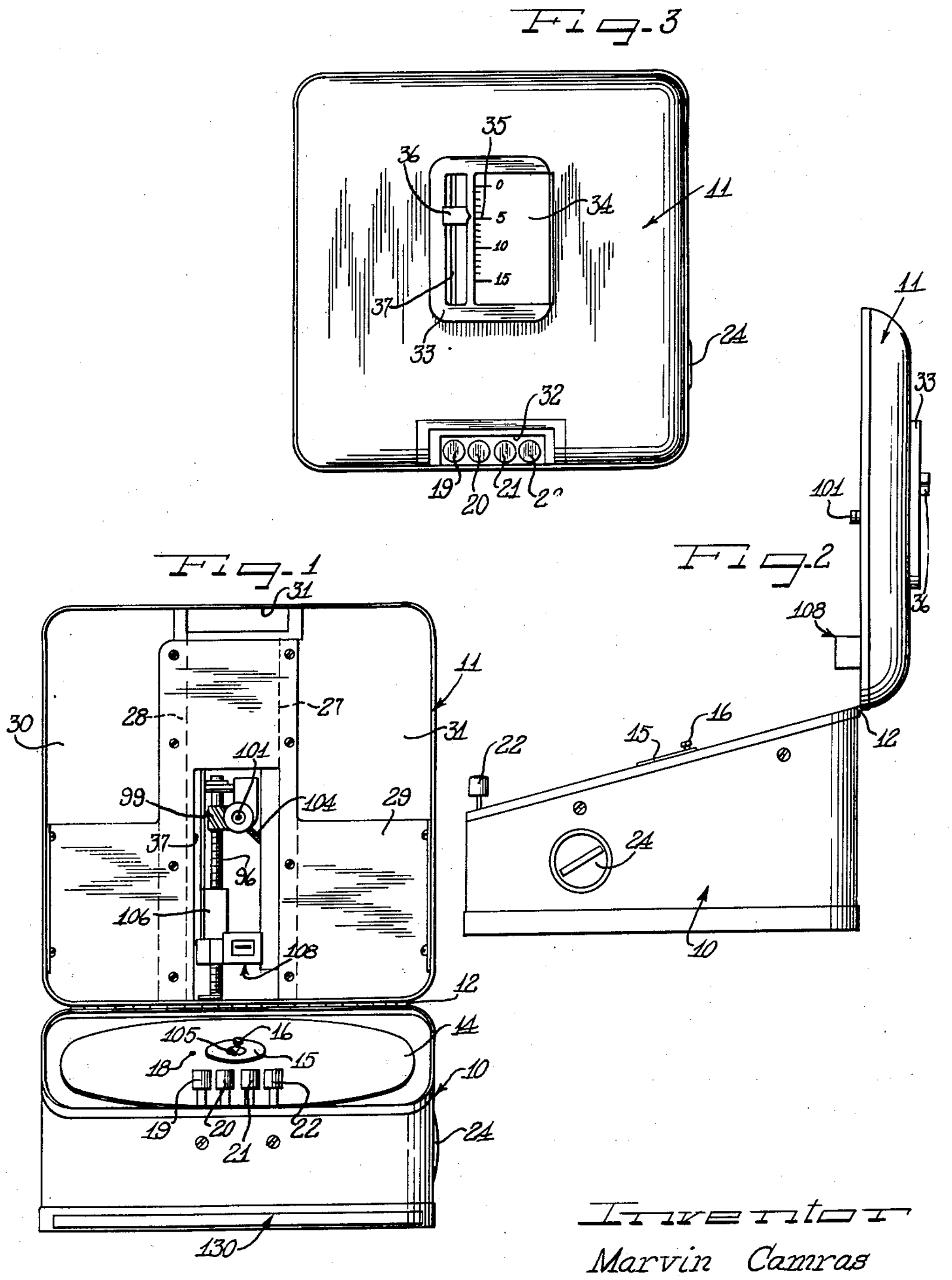
Figure 1 is a front elevational view of the assembly with the cover in its upraised position.
Figure 2 is a side elevational view of the assembly shown in Figure 1.
Figure 3 is a plan view of the cover.

The magnetic recording assembly of the present invention includes a base, generally indicated at numeral 10 and a cover member indicated at numeral 11, the base and the cover being joined by means of hinges 12. The base 10 rotatably supports a turntable 14 having a central hub portion 15. Drive pin 16 is provided on the hub portion 15 for engaging a mechanism in the cover which causes movement of the electromagnetic head in the assembly, as will hereinafter be explained.

The turntable 14 also carries a relatively small pin 18 for engaging a disk type magnetic record member to prevent relative rotative movement between the record member and the turntable.

The base assembly also carries a plurality of selector buttons, such as buttons 19, 20, 21 and 22, which can be operated selectively to place the assembly in a recording condition, a reproducing condition, to stop the mechanism, and to provide a high speed reverse drive for the turntable. The buttons also are provided with release means (not shown) which release any buttons previously locked in their engaged positions.

The base also carries a rotatable knob 24, the latter being used to operate a combined on-off switch and volume control.

As seen in Figure 1, the cover member 11 is generally recessed to accommodate the electromagnetic transducer head and the mechanism associated therewith. A pair of spaced support members 27 and 28 provide a means for securing a facing plate 29 over interior of cover 11. Spaces 30 and 31 on opposite sides of the plate 29 provide convenient storage spaces for a microphone or indexing cards used with the magnetic recording assembly. The cover is recessed as indicated at numeral 32, to permit the operating buttons 19 to 22 to extend through the cover 11 when the cover is in closed position as illustrated in Figure 3.

As shown in Figure 3, the cover 11 is provided with a raised frame 33, the frame 33 being suitably slotted to receive a flexible indexing card 34. Indicia 35, calibrated to indicate elapsed recording time are printed on one edge of the card 34 to cooperate with an indicator 36 which is slidable in a slot 37. Similar indicia may be engraved or otherwise permanently affixed to the frame 33, so that proper indexing can be achieved even when no card is used. The indicator 36 is also employed to move the electromagnetic head to any desired position on the record, as will hereinafter be explained.

Figure 4:
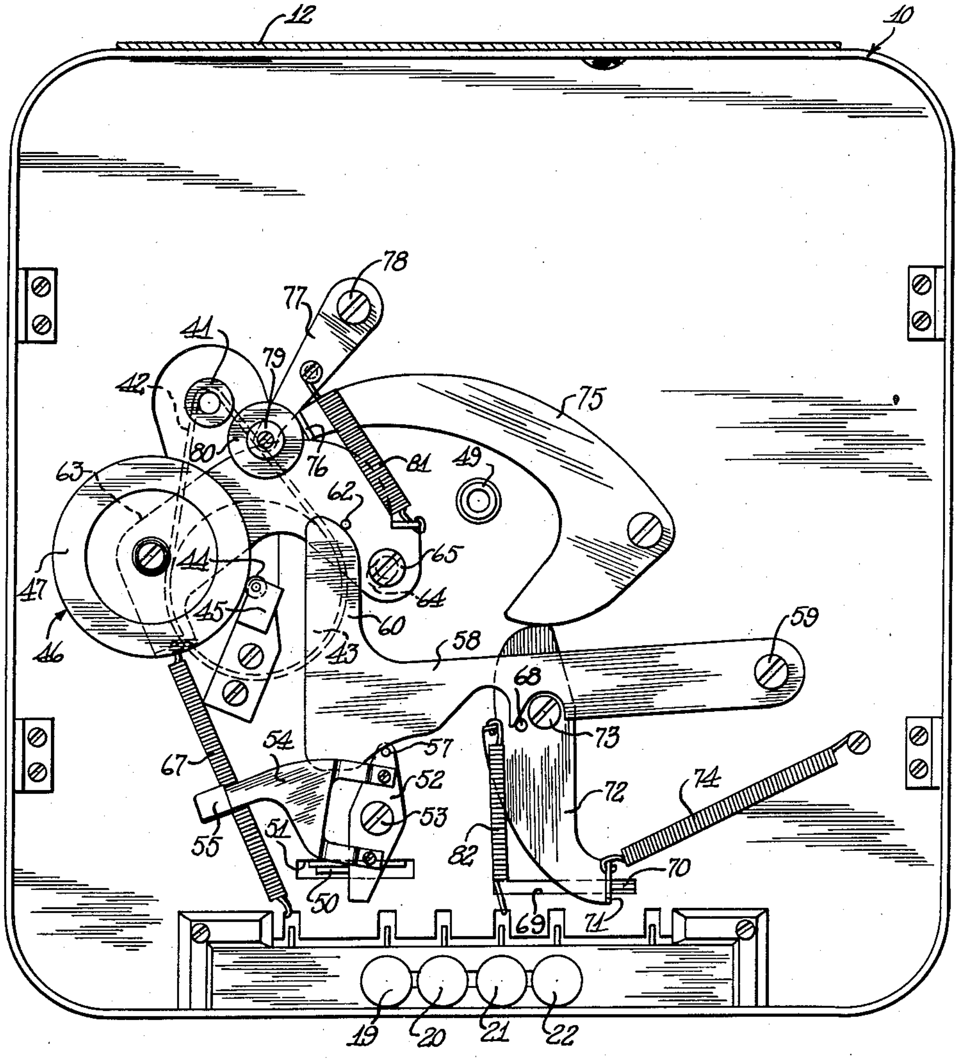
Figure 4 is a plan view of the base assembly, with the turntable member removed.
Figures 5, 9:
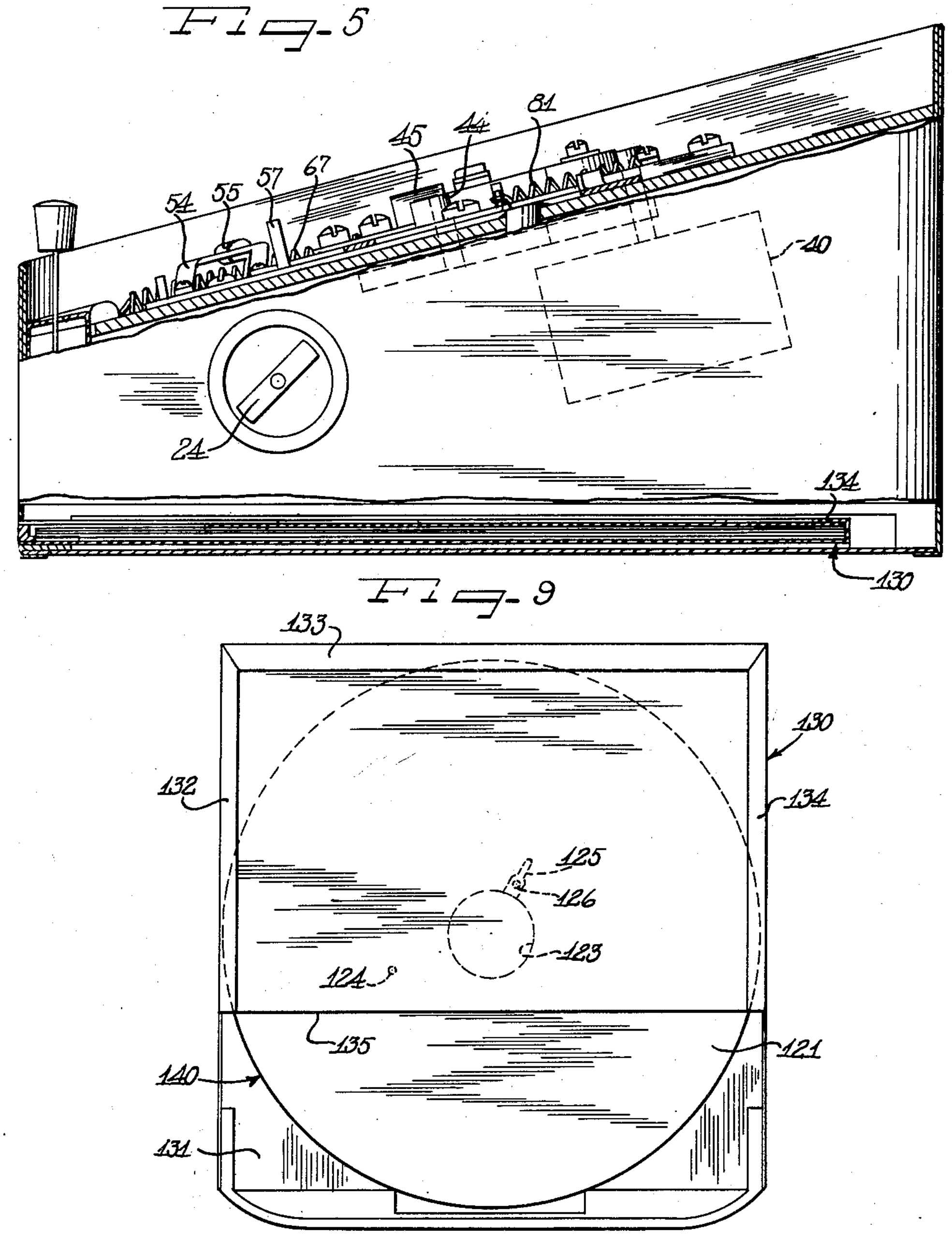
Figure 5 is a side elevational view of the assembly with the cover and turntable removed, with portions thereof broken away to illustrate the structure of the record drawer associated with the base.
Figure 9 is a plan view of the record storage drawer.

The drive mechanism for the recorder assembly is best illustrated in Figures 4 and 5 of the drawings. As seen in these two drawings, a motor 40, rigidly secured to the base, has a drive shaft 41 extending therefrom. An elastic belt 42, trained around the shaft 41, drives a relative massive flywheel 43 from the motor 40. The flywheel 43 has a relatively small diameter shaft 44 extending therefrom, the latter being journaled for rotation in a support 45. A disk 46 having an annular rubber tire 47 is driven by engagement with the shaft 44. A bearing sleeve 49 is arranged to receive a shaft associated with the turntable 14, and when the turntable 14 is in position, the inner rim of the turntable is in good frictional engagement with the periphery of the rubber tire 47. Thus, in the recording and reproducing operations, the turntable is driven from the motor by means of the belt 42, the shaft 44, and the rubber covered disk 46.

The assembly is provided with a stop operable by movement of the operating button 21. When this button is depressed, linkages (not shown) cause a lever 50 to be moved to the right in a slot 51. One end of the lever 50 engages a pivotally mounted bracket 52, arranged for pivotal rotation about a shaft 53. A bifurcated member 54 is secured to the bracket 52, and at one end carries a rubber pad 55 which, upon pivotal movement of the bracket 52, engages the rim of the turntable 14 and exerts a braking action thereon.

The bracket 52 also carries a pin 57 which is arranged to ride on the surface of a cam lever 58. The cam lever 58 is mounted for pivotal movement about a bolt 59.

The cam lever 58 has an extension 60 which engages a pin 62 on a bracket 63 which supports the rubber covered disk 46 for rotation. The bracket 63 is free to pivot within an elongated slot 64 which receives a bolt 65 extending therethrough. Thus, as the stop button 21 is depressed, the cam lever 58 pivots about the bolt 59, causing the bracket 63 to be pivoted about the bolt 65. Pivotal movement of the bracket 63 is yieldably restrained by a spring 67 having one end secured to the bracket 63 and its opposite end engaged to a stationary portion of the base. Thus, on movement of the stop button 21 the rubber covered disk 46 is moved out of engagement with the shaft 44 and at the same time a braking action is exerted by engagement of the pad 55 with the rim of the turntable 14.

The mechanism is locked in stop position when the stop button 21 is pressed, and can be reset to forward drive position by operation of the record or reproduce buttons 19 and 20. When one of the latter buttons is depressed, the stop button 21 is released, so that the spring 67 moves the bracket 63 back into position illustrated in Figure 4, where the periphery of the disk 46 is in driving engagement with the shaft 44.

The assembly is also provided with a high speed repeat mechanism which operates only as long as the repeat button 22 is held down. Upon pressure of the repeat button 22, a lever 70 slidable in a slot 69 is moved to the left as seen in Figure 4, the lever 70 engaging a raised extension 71 of a bracket 72 which is pivotally mounted to the base as at 73. A spring 74 is engaged at one end to the raised extension 71 and at its other end is secured to a stationary part of the base, so that the extension 71 is constantly urged against the lever 70.

One end of the bracket 72 engages a pivotally supported bracket 75. Bracket 75 has a raised extension 76 which engages an arm 77 pivotally mounted as at 78. The arm 77 carries a shaft 79 about which a rubber covered idler roller 80 is mounted for rotation. Thus, as long as the reversing button 22 is held depressed, the bracket 72 causes the bracket 75 to be pivoted in a clockwise direction as seen in Figure 4, so that the arm 77 is pivoted in a clockwise direction. As this occurs, the rubber covered roller 80 is pressed into wedged engagement between the shaft 41 extending from the motor and the rubber covered periphery of the disk 46. At the same time, a pin 68 engages a portion of the cam lever 58 to lift the rubber covered roller 46 out of engagement with the shaft 44 and into engagement with the roller 80. Since the roller 80 is driven directly from the shaft 41 it rotates at a substantially higher velocity than the shaft 44, so the reverse drive effected through the roller 80 will be at a substantially higher speed than the forward drive velocity.

Upon release of the reversing button 22, a spring 82 returns the bracket 72 to the original position and disengages the rubber covered roller 80 from the peripheries of the shaft 41 and the rubber covered disk 46. A spring 81 retracts the rubber covered roller 80 into the position illustrated in Figure 4.

Figure 6:
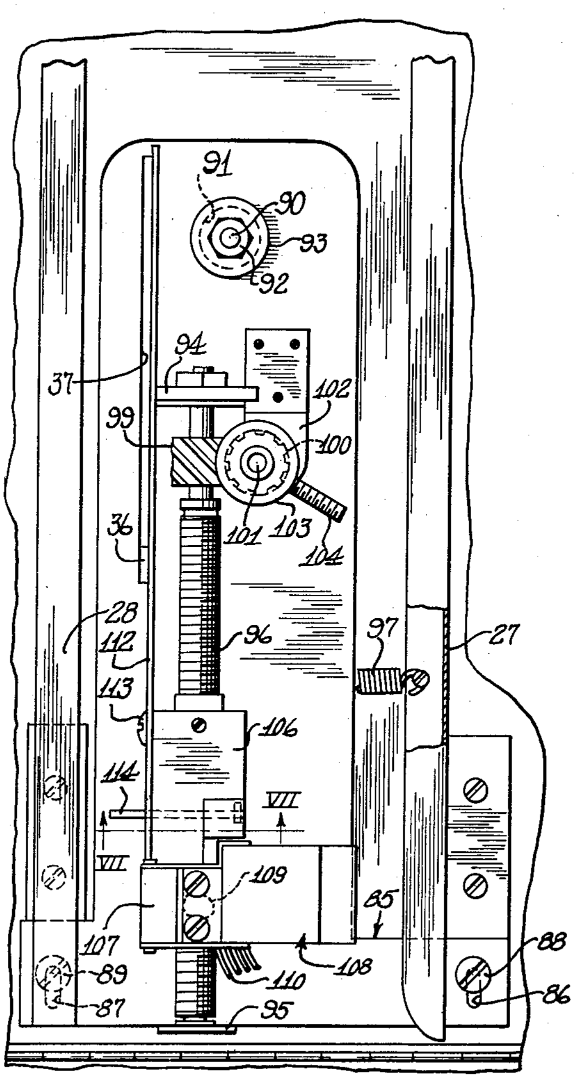
Figure 6 is a fragmentary view in elevation of the head operating means located in the cover portion.

The assembly for moving the electromagnetic head with respect to the disk record is best illustrated by the showings in Figures 1 and 6. As seen in these figures, the cover carries a subframe generally indicated at numeral 85. The subframe 85 is mounted to provide a limited amount of freedom of movement, as by providing slots 86 and 87 which receive bolts 88 and 89 to permit movement of the subframe 85 in directions parallel to the plane of the cover.

The upper end of the subframe 85 is secured to the cover by means of a bolt 90 extending through a relatively large diameter aperture 91, and having an associated nut 92 and a washer 93.

A spring 97 having one end secured to the subframe 85 and the opposite end secured to support member 27 yieldably resists movement of the subframe 85.

The subframe 85 carries an upstanding bearing support member 94 as well as a bracket 95. The bearing support 94 and the bracket 95 are arranged to journal a threaded screw 96 for rotation therebetween. The bearing support member 94 carries a cone bearing which, together with the bracket 95 is adjustable for lateral location of the head with respect to the record grooves on the disc record.

The threaded screw 96 carries a worm 99 which cooperates with a gear 100 at a gear ratio of 1 to 1, the latter being keyed or otherwise secured to a shaft 101 mounted for rotation within a bracket member 102. The shaft 101 is also provided with an annular member 103 having a pin 104 in threaded engagement with its periphery.

The shaft 101 is arranged to be received within a tapered circular recess 105 (Figure 1) in the turntable structure. The shaft 101 when seated in the recess 105 provides an accurate positioning means for locating the electromagnetic head along the disk type magnetic record member. By virtue of the limited freedom of movement of the subframe 85, the shaft 101 can be centered in the recess 105 even if there is a slight misalignment between the cover and the base.

The threaded pin 104 is arranged to engage the drive pin 16 on the turntable hub, so that rotation of the turntable when the cover is in its closed position rotates the screw 96 through the gear 100 and the worm 99.

Also carried by the screw 96 is a casing 106 which is slidable along the screw 96. One end of the casing 106 is provided with a head supporting bracket 107 which carries an electromagnetic transducer head 108. A spring 109 urges the electromagnetic head 108 outwardly from the casing 106 so that the head 108 engages a record under the positive pressure of the spring.

The type of head which may be used in the assembly of the present invention may be any one of a wide variety of types, but I prefer to use a combined recording and erase head, which includes a three legged core structure and spaced non-magnetic gaps in the surface of the core structure. A typical dimension for the recording gap is on the order of 0.00025 inch while the erase gap may be on the order of 0.003 inch.

Energizing leads 110 are provided to energize the electromagnetic head with the audio signal to be impressed thereon, and a source of high frequency bias to assist in the recording operation. Similarly, the electromagnetic erase head is also energized from a high frequency source for erasure purposes.

Figure 7:
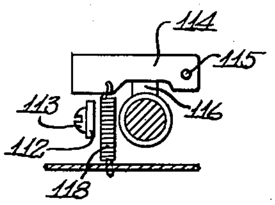
Figure 7 is a cross-sectional view taken substantially along the line VII—VII of Figure 6.

The casing 106 which carries the head 108 is coupled to the screw 96 by the system best illustrated in Figure 7 of the drawings. As shown in this drawing, the casing 106 carries a lever 112 pivotally secured thereto by means of a bolt 113. An arm 114 carried by the casing 106 and pivotally secured thereto through a pin 115, carries a follower 116. The follower 116 is urged into engagement with the threads of the screw 96 by means of a spring 118. Consequently, the follower 116 rides between the threads of the screw 96, so that the casing 106 and the head 108 are moved axially of the screw 96 as the screw is rotated. The head 108 may be selectively positioned against the record medium on the turntable in any selected position. As shown in Figure 6, the lever 112 is secured to the indicator 36 so that downward pressure on the indicator 36 causes the lever 112 to be pivoted about the bolt 113. As the lever 112 is pivoted, and end portion thereof engages the arm 114 and thereby lifts the follower 116 from engagement with the threads of the screw 96. In this condition, the casing 106 and the head 108 can be moved axially of the screw 96 to any desired position. For instance, the electromagnetic head can be moved back a distance corresponding to a recording time of one minute by pressing down on the indicator 36, followed by sliding indicator 36 to a position on the scale of the card 34 one calibration away from its original position. Movement of the head in this manner is employed for moving the head a substantial degree, while the reversing mechanism previously explained, and controlled by the reversing button 22 can be used for small increments of back spacing, should the operator wish to reproduce the intelligence immediately preceding the operating point on the magnetic record member.

The rate of movement of the electromagnetic head 108 is, of course, dependent upon the pitch of the screw 96 and the speed of its rotation. I prefer to use a turntable speed of about six revolutions per minute, and a pitch corresponding to approximately one thirty-second of an inch. In this system, there are 36 lines of magnetic recording produced per radial inch of the record. Under these conditions, when using an eight inch diameter record, the recording speed is about two and one half inches per second at the outer periphery of the record, and decreases to about one inch per second at the inner diameter of the record. The speed of the turntable can, of course, be increased if desired particularly if higher fidelity recordings are to be produced.

Figure 8:
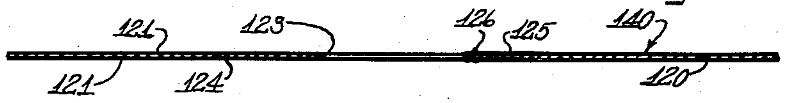
Figure 8 is a transverse sectional view of a disk type magnetic record member which can be used in the assembly of the present invention.

The structure of the magnetic disk record is best illustrated in Figures 8 and 9 of the drawings. As seen from these figures, the record includes a base 120 which may be composed of paper, plastic, metal, and the like, and having a magnetizable coating 121 containing magnetic particles dispersed therein. As seen from Figure 8, both sides of the record may have the magnetizable coating applied thereto.

The center of the record is apertured as indicated at 123 for engaging the hub 15 of the turntable. A small diameter aperture 124 is also provided to engage the pin 18 on the turntable to prevent relative rotative movement between the turntable 14 and the record member.

A flexible metal clip 125, secured to the record by means of a rivet 126 is also provided for convenience. The clip 125 is preferably suitably crimped so that the clip 125 does not extend to the magnetizable surface 121 of the record. In this way, the individual record members can be stacked neatly without danger of cutting the surface of the next adjacent record. The clip 125 provides a convenient means for fastening an indexing card 34 which is associated with a particular record. After the record is removed from the turntable, the corresponding card 34 is clipped to the record by means of the clip 125, the card 34 containing data regarding corrections to be made or instructions concerning that particular record. If desired, the clip 125 can be secured to the outer periphery of the record, instead of at the central aperture, particularly where the records are to be filed in an upright position.

The base of the magnetic recorder assembly is also provided with a storage space for receiving additional disk type magnetic record members. As best illustrated in Figures 5 and 9, the lower portion of the base 10 is recessed to receive a slidable record drawer 130. The drawer 130 includes a base plate 131 and inwardly turned marginal edges 132, 133 and 134. A partition strip 135 is secured between the opposed marginal edge portions 132 and 134. The space between the partition strip 135 and the base plate 131 provides sufficient space for receiving several disk type magnetic record members 140 in stacked relation.

From the foregoing, it will be appreciated that the present invention provides a compact, mechanically simple magnetic recording and reproducing assembly, particularly designed for use as a dictating machine. A problem of synchronizing a head with a prerecorded disk type record member is avoided in the illustrated system by the co-action between the shaft 101, the recess 105, the threaded pin 104, and the drive pin 16. Regardless of the position on the record to which the head 108 is moved, the head 108 will always be on a recorded track because the follower 116 can only be positioned on the screw 96 at intervals corresponding to the distance between the recorded tracks.

It will be understood that modifications and variations may be effected without departing from the scope of the novel concepts of the present invention.

I claim as my invention:

1. A magnetic transducing assembly comprising a base, a turntable rotatably mounted on said base for receiving a disk magnetic record medium, a cover hingedly secured to said base and movable into an open and closed position with respect to said base, an electromagnetic head carried by said cover and arranged to engage a magnetic record medium on said turntable when said cover is in closed position, and means independent of said record medium for positively synchronizing movement of said head with rotation of said turntable, said positively synchronizing means comprising first means carried centrally of said turntable and second means carried with said cover and disposed for direct engagement with said first means upon movement of said cover to closed position.

2. A magnetic transducing assembly comprising a base, a turntable rotatably mounted on said base for receiving a disk magnetic record medium, a drive means extending from said turntable, a cover hingedly secured to said base and movable into an open and closed position with respect to said base, an electromagnetic head carried by said cover, means independent of said record medium for moving said head in a radial direction with respect to said disk magnetic record medium when said cover is in closed position and in positive synchronization with rotation of said turntable, said independent means comprising coupling means carried with said cover and movable from directly engageable relation to said drive means when the cover is in closed position to disengaged relation with respect to said drive means when the cover is in open position, and means comprising said coupling means and said drive means whereby said head is completely disengaged from said turntable in open position of said cover while being reengageable with said turntable in predetermined synchronized relation upon reclosure of said cover.

3. A magnetic transducing assembly comprising a base, a turntable rotatably mounted on said base for receiving a disk magnetic record medium, drive means carried by said turntable, a cover hingedly secured to said base and movable into an open and closed position with respect to said base, an electromagnetic head carried by said cover and arranged to engage a disk magnetic record medium on said turntable when said cover is in closed position, a radial guide means for said head carried by said cover, means engaging said guide means with said head to move said head axially along said guide means upon movement of said guide means, and positive coupling means carried by said cover and engageable with said drive means on said turntable for moving said guide means in positive synchronization with rotation of said turntable when said cover is in closed position, and means for selectively disengaging said head from said guide means.

4. A magnetic transducing assembly comprising a base, a turntable rotatably mounted on said base for receiving a disk magnetic record medium, drive means carried by said turntable, a cover hingedly secured to said base and movable into an open and closed position with respect to said base, an electromagnetic head carried by said cover and arranged to engage a disk magnetic record medium on said turntable when said cover is in closed position, a threaded element carried by said cover, means engaging said threaded element with said head to move said head axially on said threaded element upon rotation of said threaded element, and positive coupling means carried by said cover and engageable with said drive means on said turntable in a preselected angular position with respect to the angular position of said turntable for rotating said threaded element when said cover is in closed position.

5. A magnetic transducing assembly comprising a base, a turntable rotatably mounted on said base for receiving a disk magnetic record medium, drive means carried by said turntable, a cover hingedly secured to said base and movable into an open and closed position with respect to said base, an electromagnetic head carried by said cover and arranged to engage a disk magnetic record medium on said turntable, when said cover is in closed position, a threaded element carried by said cover, means engaging said threaded element with said head to move said head axially along said threaded element upon rotation of said threaded element, positioning means operable from outside said cover to disengage said head from said threaded element, an indicator card detachably secured to said cover opposite positioning means for indicating the relative position of said head along said threaded element, and coupling means carried by said cover and engageable with said drive means on said turntable to rotate said threaded element when said cover is in closed position.

6. A magnetic transducing assembly comprising a base, a turntable rotatably mounted on said base for receiving a disk magnetic record medium, a cover hingedly secured to said base and movable into open and closed positions with respect to said base, a drive element extending from said turntable, an electromagnetic head carried by said cover, means independent of said head for moving said head radially along said record when said cover is in closed position, locating means associated with said last named means for engaging said turntable, and a coupling means associated with said locating means for engaging said drive element when said cover is in closed position.

7. A magnetic transducing assembly comprising a base, a turntable rotatably mounted on said base for receiving a disk magnetic record medium, a cover hingedly secured to said base and movable into open and closed positions with respect to said base, an electromagnetic head carried by said cover, means for moving said head radially along said record when said cover is in closed position, locating means associated with said last named means, means along the rotational axis of said turntable to receive said locating means, drive means independent of said record medium secured to said turntable off center from said rotational axis, and coupling means associated with said locating means for engaging said drive means when said cover is in closed position.

8. A magnetic transducing assembly comprising a base, a turntable rotatably mounted on said base for receiving a disk magnetic record medium, a cover hingedly secured to said base and movable into open and closed positions with respect to said base, drive means extending from said turntable and separate from said record medium, a threaded element carried by said cover, an electromagnetic head carried by said cover, means engaging said threaded element with said head to move said head axially on said threaded element upon rotation of said threaded element, locating means associated with said threaded element for engaging said turntable, and a coupling means associated with said locating means to engage said drive means when said cover is in closed position.

9. A magnetic transducing assembly comprising a base, a turntable rotatably mounted on said base for receiving a disk magnetic record medium, a cover hingedly secured to said base and movable into open and closed positions with respect to said base, drive means extending from said turntable, a subframe carried by said cover, said subframe being constrained for limited displacement with respect to said cover, an electromagnetic head mounted on said subframe, rotary means for moving said head radially along said record medium when said cover is in closed position, locating means carried by said subframe for engaging said turntable, and coupling means associated with said rotary means for engaging said drive means when said cover is in closed position.

10. A magnetic transducing assembly comprising a base, a turntable rotatably supported on said base for receiving a disk magnetic record medium, a cover hingedly secured to said base and movable into an open and closed position with respect to said base, an electromagnetic head carried by said cover, means independent of said head for moving said head radially along said record medium when said cover is in closed position, and a drawer slidable into said base for housing disk type magnetic records.

11. A magnetic transducing assembly comprising a base, a turntable rotatably mounted on said base, means for driving said turntable in one direction, means for driving said turntable in the opposite direction, an overhanging support associated with said base, an electromagnetic head carried by said support, and a head indexing mechanism carried by said support.

12. A magnetic transducing assembly comprising a base, a turntable rotatably mounted on said base, means for driving said turntable in one direction, means for driving said turntable in the opposite direction at a higher velocity than said turntable is driven in the first direction, an overhanging support associated with said base, an electromagnetic head carried by said support, and a head indexing mechanism carried by said support.

13. A magnetic transducing assembly comprising a base, a turntable rotatably mounted on said base for receiving a disk magnetic record medium, a cover hingedly secured to said base and movable into open and closed positions with respect to said base, drive means extending from said turntable and permanently secured for rotation therewith, an electromagnetic head carried by said cover, and means for moving said head radially along said record when said cover is in closed position, said moving means comprising means engageable with said drive means when the cover is moved to closed position and means whereby said head is completely disengaged from said turntable in opened position of said cover.

14. A magnetic transducer assembly comprising a turntable assembly rotatably mounted on a base for receiving a magnetic disk record medium, a cover hingedly secured to said base and movable into an open and closed position with respect to said base, characterized by an electromagnetic head carried by said cover and arranged to engage said magnetic disk record medium on said turntable assembly when said cover is in closed position, a head traverse mechanism carried by said cover for moving said head relative to said disk magnetic record medium, coupling means carried by said cover for driving said head traverse mechanism, and drive means secured for rotation with said turntable assembly and driven therewith for detachable driving connection with said coupling means and movable into driving relation to said coupling means by movement of said cover into closed position.

15. A magnetic transducing assembly according to claim 14, characterized by the feature that said coupling means and said drive means are operable to establish a predetermined fixed angular relation between said turntable assembly and said head traverse mechanism upon driving engagement between said drive means and said coupling means to synchronize the position of said head with the angular position of said disk magnetic record medium on said turntable assembly.

16. A magnetic transducing head assembly according to claim 14, characterized by having means operatively connected to said head and disposed for manual manipulation at the exterior side of said cover for shifting said head along said head traverse mechanism independent of rotation of said turntable assembly.

17. A magnetic transducing head assembly according to claim 14, characterized by locating means carried by said cover and cooperating means associated with said turntable assembly being interengageable upon closure of said cover to locate said drive means in predetermined driving relation to said coupling means, means mounting said head traverse mechanism and said coupling means and said locating means as a unit with limited freedom of movement for slight shifting of the unit by interengagement of said locating means and said cooperating means.

18. A transducing assembly comprising a base, a turntable rotatably mounted on said base, a support associated with said base, a transducer head carried by said support, means for driving said turntable in one direction, means for driving said turntable in the opposite direction, manually operable means for actuating said opposite direction driving means, and means for automatically terminating driving of said turntable in said opposite direction upon release of said manually operable means.

19. A transducer assembly comprising a turntable assembly rotatably mounted on a base for receiving a disk record medium, a support carried by the base and movable into an operative position with respect to the turntable assembly, a transducer head carried by the support and arranged to engage the disk record medium on the turntable assembly when the support is in operative position, a head traverse mechanism carried by the support for moving the head relative to the disk record medium, coupling means carried by the support for driving the head traverse mechanism, and drive means operatively associated with said turntable assembly and driven in synchronism therewith for detachable driving connection with said coupling means and movable into driving relation to said coupling means upon movement of said support into operative position.

20. A transducing assembly comprising a base, a turntable rotatably mounted on said base for receiving a disk record medium, a cover cooperating with said base to enclose the turntable and disk record medium thereon, a transducer head carried by the cover, a head indexing mechanism independent of the record medium carried by the cover, and means operatively connected to the head and disposed for manual manipulation at the exterior side of said cover for shifting said head relative to said head indexing mechanism independently of rotation of said turntable.

21. A transducing assembly comprising a base, a turntable rotatably mounted on said base for receiving a disk record medium, a support associated with said base, a transducer head, a head traverse mechanism carried by said support for moving said head relative to said record medium, a floating cradle carried by said support and carrying the head traverse mechanism, and means accommodating slight shifting of the cradle relative to the support.

22. A transducing assembly comprising a base, a turntable rotatably mounted on said base for receiving a disk record medium, a support associated with said base, a transducer head, a head traverse mechanism carried by said support for moving said head relative to said record medium, a floating cradle carried by said support and carrying the head traverse mechanism, means accommodating slight shifting of the cradle relative to the support, locating means carried by the cradle, and cooperating means associated with the turntable assembly and interengageable with the locating means to locate the head in predetermined relation to the turntable.

23. A transducing assembly comprising a base, a turntable rotatably mounted on said base, a support associated with said base, a transducer head carried by said support, means for normally driving said turntable at slow speed for transcription, means for momentarily driving said turntable at higher speed, manually operable means for actuating said momentarily driving means, and means biasing said manually operable means toward released position for automatically terminating driving of said turntable at said higher speed upon manual release of said manually operable means.

24. A transducing assembly comprising a base, a turntable rotatably mounted on said base, a support associated with said base, a transducer head carried by said support, a head indexing mechanism carrying said head and carried by said support, a cover for said base associated with said support, an indicator and head-positioning control extending through the cover and operatively connected to the head to engage and disengage the head from said indexing mechanism and to shift the head to any desired position, and a removable card associated with the indicator and control for cooperating with the same to indicate the position of the head relative to the indexing mechanism.

References Cited in the file of this patent

UNITED STATES PATENTS

| | | |
|---|---|---|
| 893,277 | Stuart | July 14, 1908 |
| 934,843 | Shaefer | Sept. 21, 1909 |
| 1,930,286 | Runyon | Oct. 10, 1933 |
| 1,940,274 | Severy | Dec. 19, 1933 |
| 2,078,113 | Zecha | Apr. 20, 1937 |
| 2,316,175 | Kurzen | Apr. 13, 1943 |
| 2,348,204 | Brubaker | May 9, 1944 |
| 2,350,490 | Berliner | Dec. 19, 1944 |
| 2,438,265 | Metzner | Mar. 23, 1948 |
| 2,443,756 | Williams | June 22, 1948 |
| 2,446,479 | Begun | Aug. 3, 1948 |
| 2,463,513 | Brubaker | Mar. 8, 1949 |
| 2,501,126 | Howell | Mar. 21, 1950 |
| 2,523,340 | Bonsall | Sept. 26, 1950 |
| 2,535,495 | James | Dec. 26, 1950 |
| 2,556,421 | Gee | June 12, 1951 |
| 2,567,092 | Williams | Sept. 4, 1951 |
| 2,646,283 | Doncaster | July 21, 1953 |